US011947593B2

(12) United States Patent
Jati et al.

(10) Patent No.: US 11,947,593 B2
(45) Date of Patent: Apr. 2, 2024

(54) SOUND CATEGORIZATION SYSTEM

(71) Applicant: Sony Interactive Entertainment Inc., Tokyo (JP)

(72) Inventors: Arindam Jati, Los Angeles, CA (US); Naveen Kumar, San Mateo, CA (US); Ruxin Chen, Foster City, CA (US)

(73) Assignee: SONY INTERACTIVE ENTERTAINMENT INC.

( * ) Notice: Subject to any disclaimer, the term of this patent is extended or adjusted under 35 U.S.C. 154(b) by 1311 days.

(21) Appl. No.: 16/147,331

(22) Filed: Sep. 28, 2018

(65) Prior Publication Data

US 2020/0104319 A1 Apr. 2, 2020

(51) Int. Cl.
*G06F 16/65* (2019.01)
*G06F 16/632* (2019.01)
*G06N 3/08* (2023.01)

(52) U.S. Cl.
CPC ............ *G06F 16/65* (2019.01); *G06F 16/634* (2019.01); *G06N 3/08* (2013.01)

(58) Field of Classification Search
CPC .......... G06F 16/65; G06F 16/634; G06N 3/08
See application file for complete search history.

(56) References Cited

U.S. PATENT DOCUMENTS

| 6,949,075 | B2 | 9/2005 | Hatlesad et al. |
| 7,158,931 | B2* | 1/2007 | Allegro ................ H04R 25/505 704/200 |
| 7,376,559 | B2 | 5/2008 | Tato et al. |
| 10,319,365 | B1* | 6/2019 | Nicolis ................... G10L 15/26 |
| 2006/0025827 | A1 | 2/2006 | Hatlesad et al. |
| 2007/0124293 | A1 | 5/2007 | Lakowske et al. |
| 2008/0091412 | A1* | 4/2008 | Strope ................ G06F 16/9535 704/10 |
| 2016/0192073 | A1* | 6/2016 | Poornachandran ...... H04R 3/00 381/26 |
| 2017/0065889 | A1* | 3/2017 | Cheng ................... A63F 13/497 |
| 2017/0351487 | A1 | 12/2017 | Vaquero et al. |

(Continued)

FOREIGN PATENT DOCUMENTS

| CN | 107221320 A | 9/2017 |
| CN | 109003625 A * | 12/2018 ............. G10L 25/30 |

(Continued)

OTHER PUBLICATIONS

Zheng; Weiping, "CNNs-based Acoustic Scene Classification using Multi-Spectrogram Fusion and Label Expansions", Aug. 2015, Journal of Latex Class Files, vol. 14, No. 8 (Year: 2018).*

(Continued)

*Primary Examiner* — Jefferey F Harold
*Assistant Examiner* — Alexander Boyd
(74) *Attorney, Agent, or Firm* — JDI PATENT; Joshua Isenberg; Robert Pullman

(57) ABSTRACT

A system, method, and computer program product for hierarchical categorization of sound comprising one or more neural networks implemented on one or more processors. The one or more neural networks are configured to categorize a sound into a two or more tiered hierarchical coarse categorization and a finest level categorization in the hierarchy. The categorization sound may be used to search a database for similar or contextually related sounds.

20 Claims, 5 Drawing Sheets

(56) References Cited

U.S. PATENT DOCUMENTS

2018/0336888 A1* 11/2018 Jiang ................. G06N 3/08
2019/0130231 A1* 5/2019 Liu ................... G06N 3/045

FOREIGN PATENT DOCUMENTS

| JP | 2003233386 A | 8/2003 | |
|---|---|---|---|
| JP | 2004341493 A | 12/2004 | |
| JP | 2006515191 A | 5/2006 | |
| JP | 2006322962 A | 11/2006 | |
| JP | 2015212732 A | 11/2015 | |
| WO | WO-2019244277 A1 * | 12/2019 | ............. G06F 16/53 |

OTHER PUBLICATIONS

Gu et al., "Understanding Fashion Trends from Street Photos via Neighbor-Constrained Embedding Learning", acm, Oct. 23-27, 2017. Retrieved on Jun. 11, 2019. Retrieved from.
International Search Report and Written Opinion for International Application No. PCT/US2019/052360, dated Apr. 12, 2019.
Vu et al. (2016). "Acoustic scene and event recognition using recurrent neural networks", semanticscholar.org, Mar. 9, 2016. Retrieved on Jun. 11, 2019. Retrieved from.
Gemmeke, Jort F., Daniel PW Ellis, Dylan Freedman, Aren Jansen, Wade Lawrence, R. Channing Moore, Manoj Plakal, and Marvin Ritter. "Audio set: An ontology and human-labeled dataset for audio events." In Acoustics, Speech and Signal Processing (ICASSP), 2017 IEEE International Conference on, pp. 776-780. IEEE, 2017.
He, Kaiming, Xiangyu Zhang, Shaoqing Ren, and Jian Sun. "Deep residual learning for image recognition." In Proceedings of the IEEE conference on computer vision and pattern recognition, pp. 770-778. 2016.
Hershey, Shawn, Sourish Chaudhuri, Daniel PW Ellis, Jort F. Gemmeke, Aren Jansen, R. Channing Moore, Manoj Plakal et al. "CNN architectures for large-scale audio classification." In Acoustics, Speech and Signal Processing (ICASSP), 2017 IEEE International Conference on, pp. 131-135. IEEE, 2017.
Schmidhuber, Jürgen, and Sepp Hochreiter. "Long short-term memory." Neural Comput 9, No. 8 (1997): 1735-1780.
Schroff, Florian, Dmitry Kalenichenko, and James Philbin. "Facenet: A unified embedding for face recognition and clustering." In Proceedings of the IEEE conference on computer vision and pattern recognition, pp. 815-823. 2015.
Stowell, Dan, Dimitrios Giannoulis, Emmanouil Benetos, Mathieu Lagrange, and Mark D. Plumbley. "Detection and classification of acoustic scenes and events." IEEE Transactions on Multimedia 17, No. 10 (2015): 1733-1746.
Temko, Andrey, Robert Malkin, Christian Zieger, Dušan Macho, Climent Nadeu, and Maurizio Omologo. "CLEAR evaluation of acoustic event detection and classification systems." In International Evaluation Workshop on Classification of Events, Activities and Relationships, pp. 311-322. Springer, Berlin, Heidelberg, 2006.
Wold, Erling, Thom Blum, Douglas Keislar, and James Wheaten. "Content-based classification, search, and retrieval of audio." IEEE multimedia 3, No. 3 (1996): 27-36.
Zhang, Tong, and C-CJ Kuo. "Classification and retrieval of sound effects in audiovisual data management." In Signals, Systems, and Computers, 1999. Conference Record of the Thirty-Third Asilomar Conference on, vol. 1, pp. 730-734. IEEE, 1999.
Zhang, Xiaofan, Feng Zhou, Yuanqing Lin, and Shaoting Zhang. "Embedding label structures for fine-grained feature representation." In Proceedings of the IEEE Conference on Computer Vision and Pattern Recognition, pp. 1114-1123. 2016.
Ishihara Kenji et al. "Music Retrieval Using Onomatopoeic Query", World Congress on Engineering and Computer Science, 2013 vol. 1, Oct. 23, 2013 (Oct. 23, 2013) Available at: http://www.iaeng.org/publication/WCECS2013/WCECS2013_pp437-442.pdf (Retrieved May 8, 2022).
Japanese Office Action for Country Code Application No. 2021-516976, dated May 17, 2022.
Partial European Search Report for European Application No. 19868095.1 dated May 23, 2022.
Wake Sanae et al. "Sound Retrieval with Intuitive Verbal Expressions", HCI 2014—Sand, Sea and Sky—Holiday HCI Dec. 31, 1998 (Dec. 31, 1998), pp. 1-5.
Xavier Valero et al. "Hierarchical Classification of Environmental Noise Sources Considering the Acoustic Signature of Vehicle Pass-Bys", Archives of Acoustics., vol. 37, No. 4, Jan. 1, 2012 (Jan. 1, 2012), XP055297364, PL ISSN:0137-5075, DOI: 10.2478/v10168-012-054-z.
Complete European Search Report for European Application No. 19868095.1, dated Sep. 16, 2022.
Mingchun Liu et al. "A Study on Content-based Classification and Retrieval of Audio Database," Database Engineering & Application, 2001 International Symposium on Jul. 16-18, 2001. Piscataway NJ. USA, IEEE, Jul. 16, 2001. pp. 339-345, XP010554398.
Vishnupriya s et al. "Automatic Music Genre Classification using Convolutional Neural Network," 2018 International Conference on Computer Communication and Informatics (ICCCI), IEEE, Jan. 4, 2018, pp. 1-4. XP033390554 (Retrieved on Aug. 20, 2018).
Japanese Office Action for Japanese Code Application No. 2021-516976, dated Nov. 4, 2022.

* cited by examiner

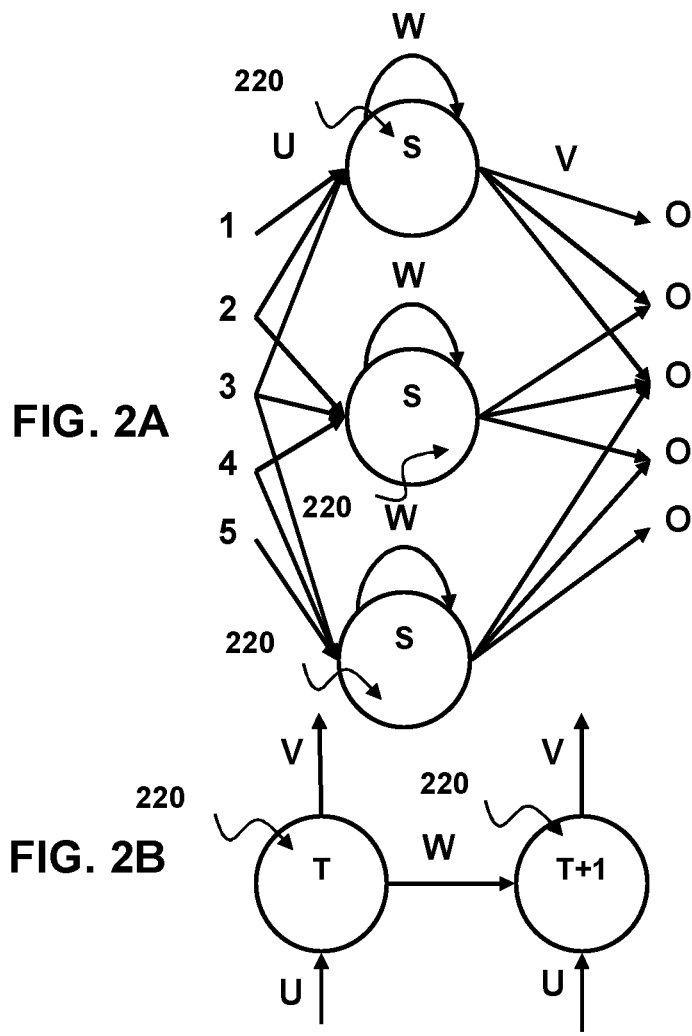
FIG. 2A
FIG. 2B
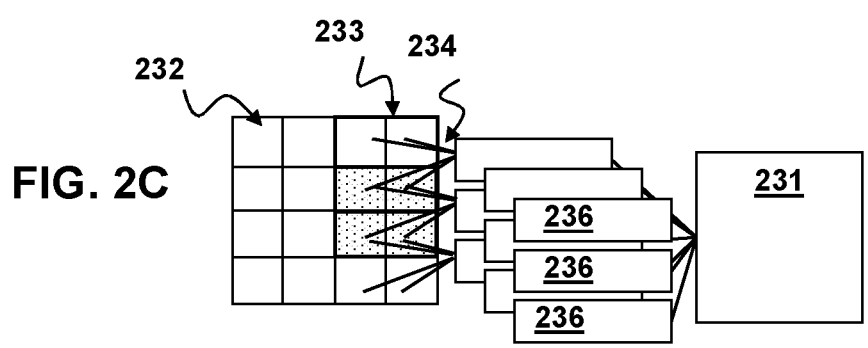
FIG. 2C

SOUND CATEGORIZATION SYSTEM

FIELD OF THE DISCLOSURE

The present disclosure relates to categorization of sounds. Specifically this disclosure relates to multi-tiered categorization of sounds using neural networks.

BACKGROUND OF THE INVENTION

The rise in popularity of movies and videogames that rely heavily on computer-generated special effects (FX) has led to the creation of vast databases containing sound files. These databases are categorized to allow for greater accessibility of the sound files to movie and videogame creators. Though categorization aids in accessibility, use of the database still requires familiarity with the contents of the database and the categorization scheme. A content creator with no knowledge of the available sounds will have great difficulty in finding the desired sounds. Thus, new content creators may waste time and resources creating sounds that already exist.

Despite these large accessible sound databases, movies and videogames often create new custom sounds. It requires extensive amounts of time and a person familiar with the categorization scheme to add new sounds to these databases.

It is within this context that embodiments of the present disclosure arise.

BRIEF DESCRIPTION OF THE DRAWINGS

The aspects of the present disclosure can be readily understood by considering the following detailed description in conjunction with the accompanying drawings, in which:

FIG. 2A is a simplified node diagram of a recurrent neural network for use in a sound categorization system according to aspects of the present disclosure.

FIG. 2B is a simplified node diagram of an unfolded recurrent neural network use in a sound categorization system for according to aspects of the present disclosure.

FIG. 2C is a simplified diagram of a convolutional neural network for use in a sound categorization system according to aspects of the present disclosure.

DESCRIPTION OF THE SPECIFIC EMBODIMENTS

Figure 1:
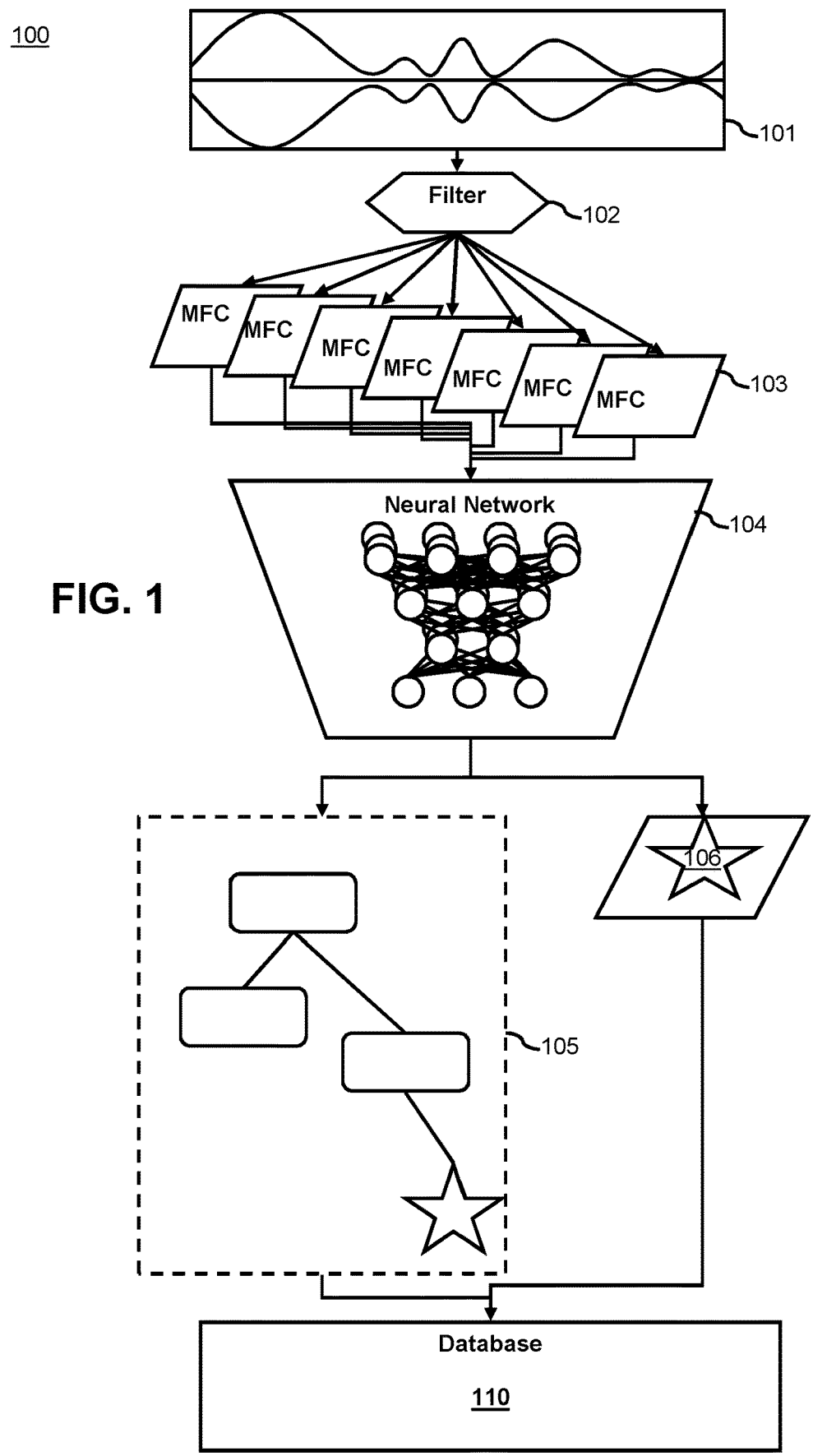
FIG. 1 is a block diagram depicting the method of sound categorization using trained sound categorization Neural Networks according to aspects of the present disclosure.

Although the following detailed description contains many specific details for the purposes of illustration, anyone of ordinary skill in the art will appreciate that many variations and alterations to the following details are within the scope of the disclosure. Accordingly, examples of embodiments of the disclosure described below are set forth without any loss of generality to, and without imposing limitations upon, the claimed disclosure.

While numerous specific details are set forth in order to provide a thorough understanding of embodiments of the disclosure, it will be understood by those skilled in the art that other embodiments may be practiced without these specific details. In other instances, well-known methods, procedures, components and circuits have not been described in detail so as not to obscure the present disclosure. Some portions of the description herein are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm, as used herein, is a self-consistent sequence of actions or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Unless specifically stated or otherwise as apparent from the following discussion, it is to be appreciated that throughout the description, discussions utilizing terms such as "processing", "computing", "converting", "reconciling", "determining" or "identifying," refer to the actions and processes of a computer platform which is an electronic computing device that includes a processor which manipulates and transforms data represented as physical (e.g., electronic) quantities within the processor's registers and accessible platform memories into other data similarly represented as physical quantities within the computer platform memories, processor registers, or display screen.

A computer program may be stored in a computer readable storage medium, such as, but not limited to, any type of disk including floppy disks, optical disks (e.g., compact disc read only memory (CD-ROMs), digital video discs (DVDs), Blu-Ray Discs™, etc.), and magnetic-optical disks, read-only memories (ROMs), random access memories (RAMs), EPROMs, EEPROMs, magnetic or optical cards, flash memories, or any other type of non-transitory media suitable for storing electronic instructions.

The terms "coupled" and "connected," along with their derivatives, may be used herein to describe structural relationships between components of the apparatus for performing the operations herein. It should be understood that these terms are not intended as synonyms for each other. Rather, in particular embodiments, "connected" may be used to indicate that two or more elements are in direct physical or electrical contact with each other. In some instances, "connected", "connection", and their derivatives are used to indicate a logical relationship, e.g., between node layers in a neural network (NN). "Coupled" may be used to indicated that two or more elements are in either direct or indirect (with other intervening elements between them) physical or electrical contact with each other, and/or that the two or more elements co-operate or communicate with each other (e.g., as in a cause an effect relationship).

Sound Categorization System

Currently there exist large databases of sound FX for movies and videogames. These large databases are manually categorized using an uneven multi-tiered categorization scheme. In one example scheme, the database has many categories and each category has one or more daughter subcategories with the actual sounds being listed under each subcategory. Machine learning has been used to train neural networks to cluster and classify data sets. Prior datasets usually consisted of objects that already had an inherent categorization by design. For example, prior clustering problems include determining whether a car is a sedan or coupe. The car industry explicitly manufactures cars in either sedan or coupe designs and as such, the difference between these two types of vehicles is inherent.

When a human categorizes sounds in a sound FX database, factors outside of the acoustic properties of the sound are used to determine what categorization the sound requires. For example, a human categorizer will know something about the origin of the sound, e.g., whether a sound was produced by an explosion or a gun shot. This information is not available from the sound data alone. An insight of the current disclosure is that sounds, which have no inherent categorization, may have a categorization applied to them in a reliable manner based purely on the properties of the sound. Furthermore, by learning similarities between sound samples based on their acoustic similarity a machine learning system can learn new sound classes. As such, searching and categorization of these large databases may be aided by the use of machine learning. It should be understood that while the current disclosure discusses two-tiered categorization it is not limited to such a structure and the teachings may be applied to a database having any number of tiers.

The sound categorization system may aid in searching large databases for a particular sound or a particular type of sound. Categorization refers to the general concept of hierarchical classification, i.e., coarse to fine categorization (like along the nodes of a sound hierarchy tree). Where by way of example and not by way of limitation there are coarse classifications and fine grained classifications, and there are multiple coarse grained classifications or categories before the finest grained classification or category. In some implementations, the system may categorize onomatopoeic sounds vocalized by the user. As used herein, the term onomatopoeic sounds refers to words or vocalizations that describe or suggest a particular sound. The system may use the categorization of the onomatopoeic sound to search a sound FX database for a real recorded sound matching the categorization of the onomatopoeic sound. One advantage of the hierarchical database is that the system may present multiple similar sounds with varying degrees of dissimilarity based on both subcategory and category. In some embodiments the search may, for example provide the top three most similar sounds. In other embodiments, the search may provide a selection of similar sounds from the same subcategory and category. The selection of similar sounds may be sounds that are contextually related to the input sound. In other implementations, the system may simply categorize a real recorded sound and store the real recorded sound in the Sound FX database according to the categorization. In some alternative embodiments the real recorded sound may be an onomatopoeic sound vocalized by the user as in some cases the user may desire vocal sounds to be used as real sound FX, for example comic book media may use onomatopoeic sounds to emphasize action.

While large sound FX categorization is one application of aspects of the present disclosure, other applications are also envisioned. In one alternative implementation, the large sound FX database may be replaced with a time-stamped or locationally organized database of sounds for a particular video game. The trained categorization neural network determines the location of a player within the game based on the categorization sound played to the player. This particular implementation benefits non-localized emulators as no information is needed from the emulation server other than sound, which is already being sent to the user.

In another implementation, the hierarchical database of sounds may be tied to haptic events such as the vibration of a controller or the pressure on a joystick. Ad hoc haptic feedback could be added to games lacking actual haptic information using the sound categorization NN. The categorization NN may simply receive game audio, categorize the audio and the categorization may be used determine a haptic event which is provided to the user. Additionally the categorization system may provide additional information to impaired users. For example and without limitation, the application may provide higher category sound to control left hand vibration pattern and use a lower level subcategory sound to control right hand high frequency vibration.

By way of example, and not by way of limitation, some output modalities could help a hearing-impaired person, e.g., using a cellphone or eyeglass with a built-in microphone, processor, and visual display. Neural networks running on the processor could categorize sounds picked up by the microphone. The display could present visual feedback identifying the sound category, e.g., in text format such as a closed caption.

Current sound FX databases rely on a two-tiered approach. In a two-tiered database, the target is to build a classifier that can classify both categories and subcategories correctly. The two-tiered database according to aspects of the present disclosure has labels separated into two classes: "coarse" and "fine". Coarse class labels are the category labels. Fine class labels are category+subcategory labels. While the methods and systems described herein discuss a two-tiered database, it should be understood that teachings may be applied to a database having any number of category tiers. According to aspects of the present disclosure and without limitation, the database may be a two-tiered uneven hierarchical database with 183 categories and 4721 subcategories. The database may be searched by known methods such as index look up. Examples of suitable search programs include commercially available digital audio workstation (DAW) software and other software such as Soundminer software from Soundminer Inc. of Toronto, Ontario, Canada.

The scheme of operation of the sound categorization system 100 begins with a segment of sound 101. Multiple filters are applied 102 to the segment of sound 101 to create windows sound and generate a representation of the sound in a Mel-frequency cepstrum 103. The Mel-frequency cepstrum representations are provided to trained sound categorization Neural Networks 104. The trained sound categorization NNs output a vector 105 representing the category and subcategory of the sound as well as a vector representing the finest level category of the sound i.e., the finest level classification 106. This categorization may then be used to search a database 110 for similar sounds as discussed above.

Filtering Samples

Before classification and clustering, the sound FX may be processed to aid in classification. In some implementations, Mel cepstrum spectrogram features are extracted from the audio files. To extract Mel cepstrum spectrogram features the audio signal is broken into a number of time windows and each window is converted to a frequency domain signal, e.g., by fast Fourier transform (FFT). This frequency or spectral domain signal is then compressed by taking a logarithm of the spectral domain signal and then performing another FFT. The cepstrum of a time domain signal S(t) may be represented mathematically as FT(log(FT(S(t)))+j2πq), where q is the integer required to properly unwrap the angle or imaginary part of the complex log function. Algorithmically: the cepstrum may be generated by the sequence of operations: signal→FT→log→phase unwrapping→FT→cepstrum. The cepstrum can be seen as information about rate of change in the different spectral bands within the sound window. The spectrum is first transformed using Mel Filterbanks (MFBs), which differ from Mel Frequency Cepstral Coefficients (MFCCs) in having one less final processing step of Discrete Cosine Transform (DCT). s. A frequency fin hertz (cycles per second) may be converted to a mel frequency m according to: m=(1127.01048 Hz) $\log_e(1+f/700)$. Similarly, a mel frequency m can be converted to a frequency fin hertz using: f=(700 Hz)($e^{m/1127.01048}$−1). For example and without limitation sound FXs may be converted to 64 dimensional Mel cepstrum spectrograms with a moving window 42.67 ms length and 10.67 ms shift Batch training is employed for NN training. Random windows of Mel-frequency converted sound, i.e., feature frames are generated, and dimensional samples are fed into the model for training. By way of example and not by way of limitation 100 random feature frames may be chosen where each of the feature frames are 64 dimensional samples.

Neural Network Training

The neural networks that implement the categorization of Sound FX 104 may include one or more of several different types of neural networks and may have many different layers. By way of example and not by way of limitation the classification neural network may consist of one or multiple convolutional neural networks (CNN), recurrent neural networks (RNN) and/or dynamic neural networks (DNN).

FIG. 2A depicts the basic form of an RNN having a layer of nodes 220, each of which is characterized by an activation function S, one input weight U, a recurrent hidden node transition weight W, and an output transition weight V. It should be noted that the activation function S may be any non-linear function known in the art and is not limited to the (hyperbolic tangent (tan h) function. For example, the activation function S may be a Sigmoid or ReLu function. Unlike other types of neural networks, RNNs have one set of activation functions and weights for the entire layer. As shown in FIG. 2B the RNN may be considered as a series of nodes 220 having the same activation function moving through time T and T+1. Thus, the RNN maintains historical information by feeding the result from a previous time T to a current time T+1.

There are a number of ways in which the weights, U, W, V may be configured. The input weight U may be applied based on the Mel-frequency spectrum. The weights for these different inputs could be stored in a lookup table and be applied as needed. There could be default values that the system applies initially. These may then be modified manually by the user or automatically by machine learning.

In some embodiments, a convolutional RNN may be used. Another type of RNN that may be used is a Long Short-Term Memory (LSTM) Neural Network which adds a memory block in a RNN node with input gate activation function, output gate activation function and forget gate activation function resulting in a gating memory that allows the network to retain some information for a longer period of time as described by Hochreiter & Schmidhuber "Long Short-term memory" Neural Computation 9(8):1735-1780 (1997), which is incorporated herein by reference.

FIG. 2C depicts an example layout of a convolution neural network such as a CRNN according to aspects of the present disclosure. In this depiction, the convolution neural network is generated for an image 232 with a size of 4 units in height and 4 units in width giving a total area of 16 units. The depicted convolutional neural network has a filter 233 size of 2 units in height and 2 units in width with a skip value of 1 and a channel 236 of size 9. For clarity in FIG. 2C only the connections 234 between the first column of channels and their filter windows is depicted. Aspects of the present disclosure, however, are not limited to such implementations. According to aspects of the present disclosure, the convolutional neural network that implements the categorization 229 may have any number of additional neural network node layers 231 and may include such layer types as additional convolutional layers, fully connected layers, pooling layers, max pooling layers, local contrast normalization layers, etc. of any size.

Figure 2D:
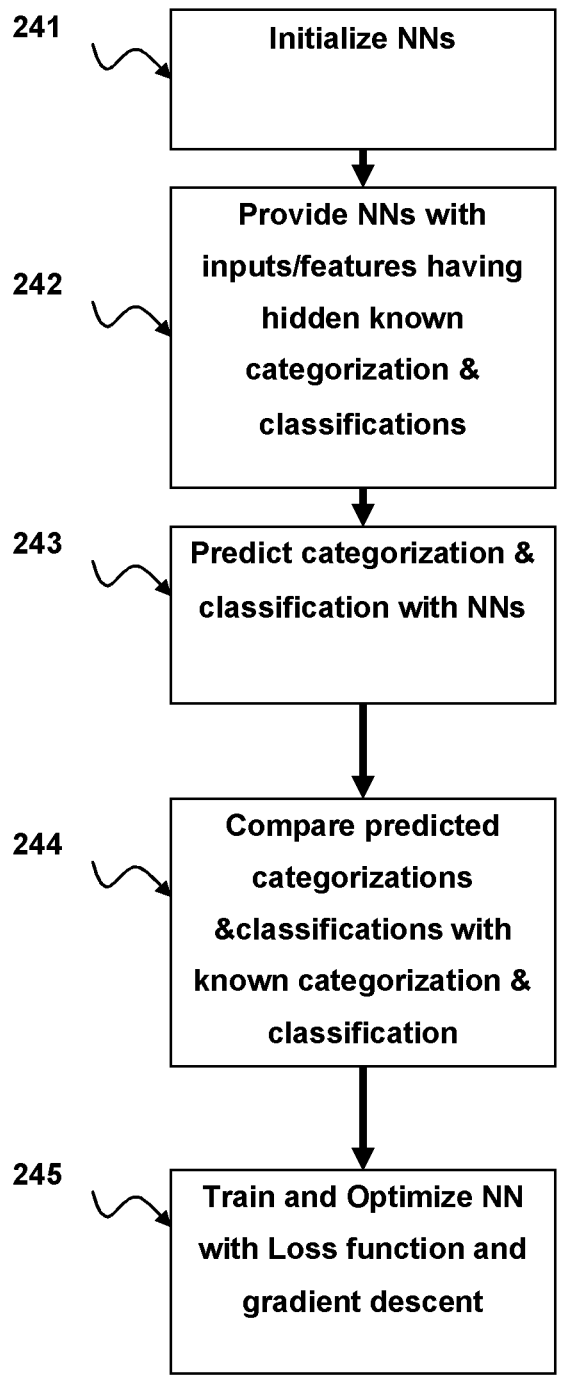
FIG. 2D is a block diagram of a method for training a neural network in a sound categorization system according to aspects of the present disclosure.

As seen in FIG. 2D Training a neural network (NN) begins with initialization of the weights of the NN 241. In general, the initial weights should be distributed randomly. For example, an NN with a tan h activation function should have random values distributed between $$-\frac{1}{\sqrt{n}}$$

and $$\frac{1}{\sqrt{n}}$$

where n is the number of inputs to the node.

After initialization the activation function and optimizer is defined. The NN is then provided with a feature or input dataset 242. Each of the different features vector may be provided with inputs that have known labels. Similarly, the Categorization NN may be provided with feature vectors that correspond to inputs having known labeling or classification. The NN then predicts a label or classification for the feature or input 243. The predicted label or class is compared to the known label or class (also known as ground truth) and a loss function measures the total error between the predictions and ground truth over all the training samples 244. By way of example and not by way of limitation the loss function may be a cross entropy loss function, quadratic cost, triplet contrastive function, exponential cost, etc.

Multiple different loss functions may be used depending on the purpose. The NN is then optimized and trained, using the result of the loss function and using known methods of training for neural networks such as backpropagation with stochastic gradient descent etc. 245. In each training epoch, the optimizer tries to choose the model parameters (i.e., weights) that minimize the training loss function (i.e. total error). Data is partitioned into training, validation, and test samples.

During training, the Optimizer minimizes the loss function on the training samples. After each training epoch, the mode is evaluated on the validation sample by computing the validation loss and accuracy. If there is no significant change, training can be stopped. Then this trained model may be used to predict the labels of the test data.

Thus, the categorization neural network may be trained from audio input having known labels or classifications to identify and classify those audio inputs by minimizing the cross entropy loss given known target labels.

Hierarchy-Preserving Representation Learning

In addition to simple cross entropy loss, training the NNs according to aspects of the present disclosure may employ metric learning. Metric learning via Siamese or triplet loss has an inherent ability to learn complex manifolds or representations. For SFX classification, metric learning improves clustering in embedding space compared using only cross entropy. The overall joint loss function according to aspects of the present disclosure is given by $$L_{total} = L_C + L_{metric} \quad (1)$$

where $L_{CE}$ is cross entropy loss for classification and $L_{metric}$ is the metric learning loss which is either $L_{triplet}$ or $L_{quadruplet}$ as described below.

Uniform triplet training does not consider the hierarchical label structure, and possibly most of the negative samples are taken from a category that is different as the anchor's category. To counter act this, the triplet negative mining may be performed in a probabilistic way so that the model encounters some triplets where the negative sample comes from the same category but different subcategory. Given M samples, a triplet $\{t_i\}_{i=1}^{M}$, where $t_i = (x_a^{(i)}, x_p^{(i)}, x_n^{(i)})$, is formed by choosing anchor, positive and negative samples in the following way:

1. Choose anchor $x_a^{(i)}$ from category C and subcategory S.
2. Choose positive $x_p^{(i)}$ such that $x_p^{(i)} \in S$.
3. Choose negative $x_n^{(i)}$:

$$x_n^{(i)} = I(r=0) \times \{x_n^{(i)}: x_n^{(i)} \in C \quad \text{and} \quad x_n^{(i)} \notin S\} + I\{r=1\} \times \{x_n^{(i)}: x_n^{(i)} \notin C\} \quad (2)$$

Here r is Bernoulli random variable r~Ber(0.5). I(.) is the indicator function. Then the triplet loss over a batch of N samples is taken.

$$L_{triplet}(x_a^{(i)}, x_p^{(i)}, x_n^{(i)}, m) = \frac{1}{N} \sum_{i=1}^{N} \max\left(0, \|e(x_a^{(i)}) - e(x_p^{(i)})\|_2^2 - \|e(x_a^{(i)}) - e(x_n^{(i)})\|_2^2 + m\right) \quad (3)$$

Here m is a non-negative margin parameter.

A further improvement to the metric learning network may be achieved through the use of a quadruplet loss instead of triplet. Quadruplet loss tries to preserve embedding structure and provides more information about the hierarchies to which the input is classified. The quadruplet loss is given:

$$L_{quadruplet}(x_a^{(i)}, x_{p+}^{(i)}, x_{p-}^{(i)}, m_1, m_2) = \frac{1}{2}[L_{triplet}(x_a^{(i)}, x_{p+}^{(i)}, x_{p-}^{(i)}, m_1) + L_{triplet}(x_a^{(i)}, x_{p-}^{(i)}, x_n^{(i)}, m_s)] \quad (4)$$

A quadruplet tuple is chosen as follows:
1. Choose anchor $x_0^{(i)}$ from category C and subcategory S.
2. Choose strong positive $x_{p+}^{(i)}$ such that $x_{p+}^{(i)} \in S$.
3. Choose weak positive $x_{p-}^{(i)}$ such that $x_{p-}^{(i)} \in C$ and $x_{p-}^{(i)} \notin S$.
4. Choose negative $x_n^{(i)}$ such that $x_n^{(i)} \notin C$.

As shown in FIG. 2D during training 245 the quadruplet or triplet loss function and the cross-entropy loss function are used during optimization as discussed above. Additionally the combination cross-entropy loss and quadruplet/triplet loss function used during optimization may be improved with the addition of a weighting factor λ to compensate between the tradeoff between the two types of losses. Thus, the new combined loss equation is expressed as:

$$L_{total} = (\lambda)L_{ce} + (1-\lambda)L_{metric}$$

To extend this system to a hierarchy having any number of tiers the metric learning loss function is simply modified by recursively applying the method to all nodes of the hierarchy.

This combined training allows for improved categorization of inputs.

Combined Training

Figure 3:
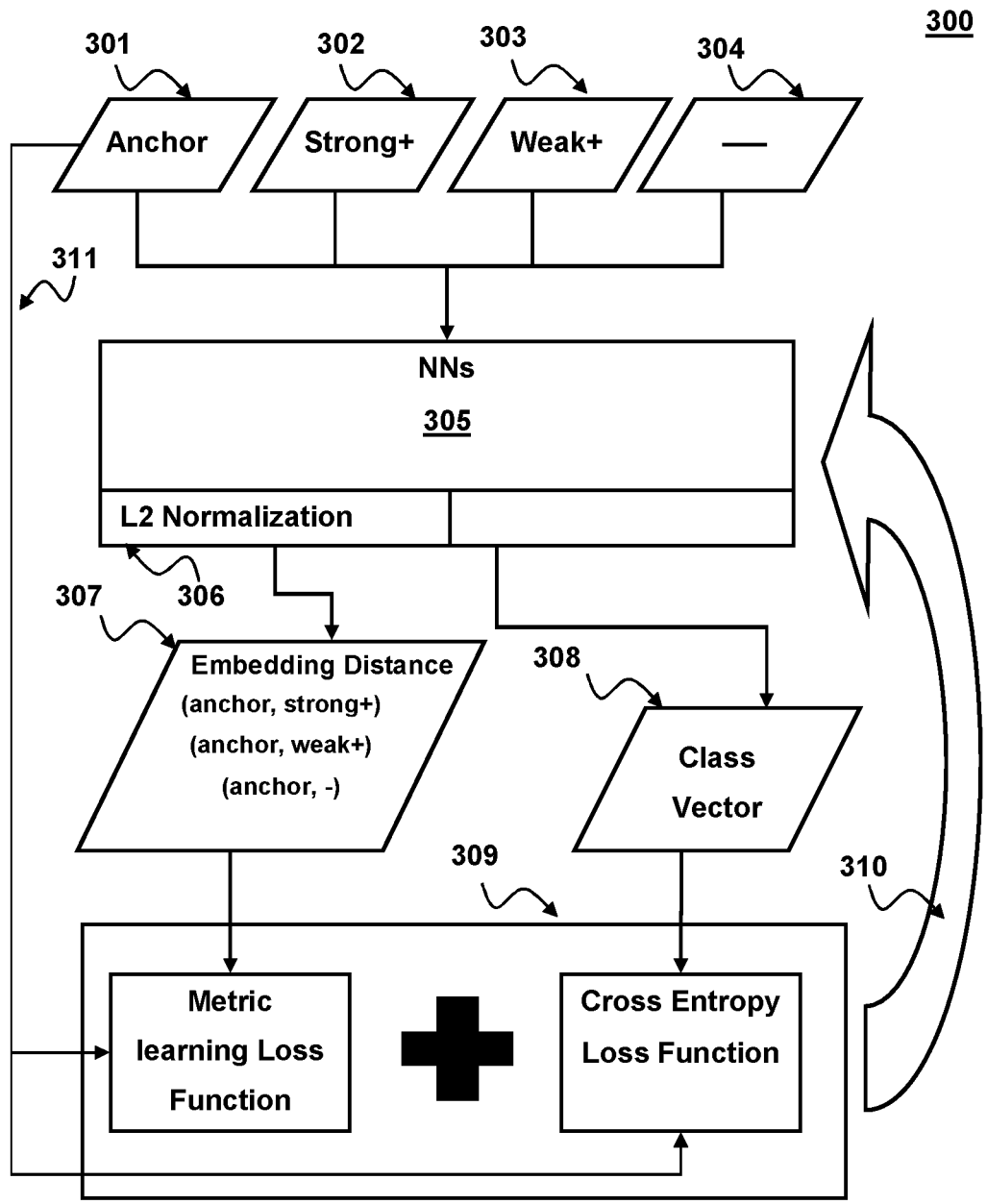
FIG. 3 is a block diagram showing the combined metric learning and cross entropy loss function learning method for training a neural network in a sound categorization system according to aspects of the present disclosure.

FIG. 3 shows a schematic diagram of training the sound FX categorization system 300 with combined cross entropy loss function and metric learning loss function 309. During training, samples representing the anchor 301, strong positive 302, weak positive 303 and negative 304 are provided to the neural network 305. Note: that in implementations using triplet learning only an anchor, positive and negative samples are provided. The neural networks 305 may comprise one or more neural networks having any number of layers. By way of example and not by way of limitation in a network having two tiers there are four networks that share parameters during training. These networks represent the (f(Anchor), f(strong+), f(weak+), f(−)). An L2 normalization layer 306 is used on the output layer of the Neural Networks 305 to produce the embedding distance 307. The output from L2 Normalization 306 is a "normalized" vector called "embedding" which 308 converts to a class vector but 307 uses it to compute distances between 3 pairs of embeddings corresponding to the inputs 301-304. These distances can then be used for metric learning loss function. The label of the anchor 311 is passed through for use in the loss functions. The metric learning loss function is then applied to the embeddings distance 307. Additionally the result of f(Anchor) is also used to provide the finest level classification, which may be in the form of a vector 308 representing finest level subcategory. As discussed above, during training the loss for the metric learning function and the cross entropy function is calculated and added together 309. The combined metric learning loss and cross entropy loss is then used for optimization in the mini-batch back-propagation with stochastic gradient descent algorithm 310.

Implementation

Figure 4:
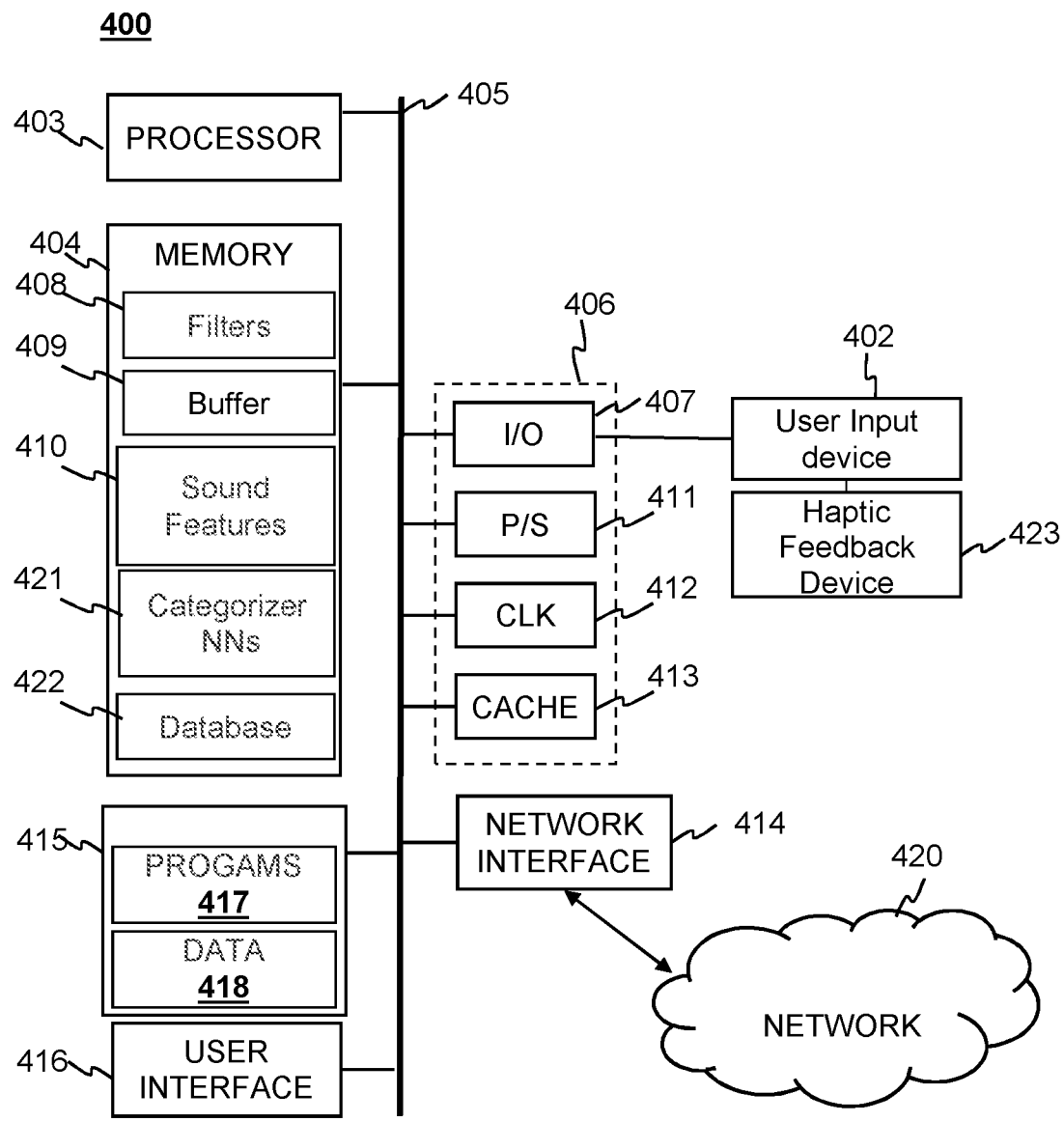
FIG. 4 depicts a block diagram of a system implementing the sound categorization method using trained sound categorization and classification Neural Networks according to aspects of the present disclosure

FIG. 4 depicts a sound categorization system according to aspects of the present disclosure. The system may include a computing device 400 coupled to a user input device 402. The user input device 402 may be a controller, touch screen, microphone, keyboard, mouse, joystick or other device that allows the user to input information including sound data in to the system. The user input device may be coupled to a haptic feedback device 423. The haptic feedback device 423 may be for example a vibration motor, force feedback system, ultrasonic feedback system, or air pressure feedback system.

The computing device 400 may include one or more processor units 403, which may be configured according to well-known architectures, such as, e.g., single-core, dual-core, quad-core, multi-core, processor-coprocessor, cell processor, and the like. The computing device may also include one or more memory units 404 (e.g., random access memory (RAM), dynamic random access memory (DRAM), read-only memory (ROM), and the like).

The processor unit 403 may execute one or more programs, portions of which may be stored in the memory 404 and the processor 403 may be operatively coupled to the memory, e.g., by accessing the memory via a data bus 405. The programs may be configured to implement sound filters 408 to convert the sounds to the Mel-frequency cepstrum. Additionally the Memory 404 may contain programs that implement training of a sound categorization NNs 421. The Memory 404 may also contain software modules such as the sound filters 408, multi-tiered sound database 422 and a sound categorization NNs Module 421. The sound database 422 may be stored as data 418 in the Mass Store 415 or at a server coupled to the Network 420 accessed through the network interface 414.

The overall structure and probabilities of the NNs may also be stored as data 418 in the Mass Store 415. The processor unit 403 is further configured to execute one or more programs 617 stored in the mass store 415 or in memory 404 which cause processor to carry out the method 300 of training the sound categorization NN 421 from the sound database 422. The system may generate Neural Networks as part of the NN training process. These Neural Networks may be stored in memory 404 in the sound categorization NN module 421. Completed NNs may be stored in memory 404 or as data 418 in the mass store 415. The programs 417 (or portions thereof) may also be configured, e.g., by appropriate programming, to apply appropriate filters 408 to sounds entered by users, categorize the filtered sound with the sound categorization NN 421 and search the sound category database 422 for similar or identical sounds. Additionally programs 417 may be configured to utilize the result of the sound categorization to create a haptic feedback event using the haptic feedback device 423.

The computing device 400 may also include well-known support circuits, such as input/output (I/O) 407, circuits, power supplies (P/S) 411, a clock (CLK) 412, and cache 413, which may communicate with other components of the system, e.g., via the bus 405. The computing device may include a network interface 414. The processor unit 403 and network interface 414 may be configured to implement a local area network (LAN) or personal area network (PAN), via a suitable network protocol, e.g., Bluetooth, for a PAN. The computing device may optionally include a mass storage device 415 such as a disk drive, CD-ROM drive, tape drive, flash memory, or the like, and the mass storage device may store programs and/or data. The computing device may also include a user interface 616 to facilitate interaction between the system and a user. The user interface may include a monitor, Television screen, speakers, headphones or other devices that communicate information to the user.

The computing device 400 may include a network interface 414 to facilitate communication via an electronic communications network 420. The network interface 414 may be configured to implement wired or wireless communication over local area networks and wide area networks such as the Internet. The device 400 may send and receive data and/or requests for files via one or more message packets over the network 420. Message packets sent over the network 420 may temporarily be stored in a buffer 409 in memory 404. The categorized sound database may be available through the network 420 and stored partially in memory 404 for use.

While the above is a complete description of the preferred embodiment of the present disclosure, it is possible to use various alternatives, modifications and equivalents. It is to be understood that the above description is intended to be illustrative, and not restrictive. For example, while the flow diagrams in the figures show a particular order of operations performed by certain embodiments of the disclosure, it should be understood that such order is not required (e.g., alternative embodiments may perform the operations in a different order, combine certain operations, overlap certain operations, etc.). Furthermore, many other embodiments will be apparent to those of skill in the art upon reading and understanding the above description. Although the present disclosure has been described with reference to specific exemplary embodiments, it will be recognized that the disclosure is not limited to the embodiments described, but can be practiced with modification and alteration within the spirit and scope of the appended claims. The scope of the disclosure should, therefore, be determined with reference to the appended claims, along with the full scope of equivalents to which such claims are entitled. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A system for hierarchical categorization of sound comprising:
    one or more processors;
    one or more neural networks implemented on the one or more processors configured to categorize a sound into a two or more tiered hierarchical coarse categorization and a finest level categorization in the hierarchy, wherein the one or more neural networks are trained with a combination of a metric learning function and a cross-entropy loss function learning wherein a loss of the metric learning function and a loss of the cross-entropy loss function are added together; and
    one or more haptic feedback devices, wherein a first haptic event for the one or more haptic feedback devices is determined by a coarse categorization in the hierarchical categorization of a sound, and wherein a second haptic event for the one or more haptic feedback devices is determined by a fine categorization in the hierarchy of the sound.

2. The system of claim 1, wherein the metric learning function is a triplet loss function.

3. The system of claim 1, wherein the metric learning function is a quadruplet loss function.

4. The system of claim 1, wherein the sound is an onomatopoeic sound.

5. The system of claim 4, wherein the onomatopoeic sound is vocalized by a user.

6. The system of claim 1, wherein the one or more neural networks are executable instructions stored in a non-transitory computer readable medium that when executed cause the processor to execute the neural network computations.

7. The system of claim 6, further comprising a database and wherein the executable instructions further comprise searching the database for the result of the categorization from the neural network.

8. The system of claim 6, wherein the executable instructions further comprise storing sound data in a hierarchical database according to the categorization performed by the one or more neural networks.

9. The system of claim 6, wherein the instructions further comprise executable instructions for discovering contextually related sounds in a database using the result of the categorization from the one or more neural networks.

10. The system of claim 1, wherein the sound is digitized and converted to the Mel Frequency cepstrum before categorization.

11. The system of claim 1 wherein a first weighting factor is used with the loss of the cross-entropy loss function and the loss of the metric learning function.

12. The system of claim 1, wherein the one or more haptic feedback devices includes a first haptic feedback device and a second haptic feedback device, wherein the first haptic event is for the first haptic feedback device and wherein the second haptic event is for the second haptic feedback device.

13. Computer executable instructions embedded in a non-transitory computer readable medium that when executed implement one or more neural networks configured to categorize a sound into a two or more tiered hierarchical coarse categorization and a finest level categorization in the hierarchy, wherein the one or more neural networks are trained with a combination of metric learning and a cross-entropy loss function learning, wherein the coarse categorization in the hierarchical categorization of the sound determines a first haptic event for one or more haptic feedback devices and a fine categorization in the hierarchy of the sound determines a second haptic event for the one or more haptic feedback devices.

14. The computer executable instructions of claim 13, wherein the sound is an onomatopoeic sound.

15. The computer executable instructions of claim 14, wherein the onomatopoeic sound is vocalized by a user.

16. The computer executable instructions of claim 13, wherein the instructions further comprise searching a database for the result of the categorization from the neural network.

17. A method for hierarchical classification of sound comprising:

Using a Neural Network to categorize a sound into a two or more tiered hierarchical coarse categorization and a finest level categorization in the hierarchy, wherein the one or more neural networks are trained with a combination of a metric learning function and a cross-entropy loss function learning wherein a loss of the metric learning function and a loss of the cross-entropy loss function are added together, wherein the coarse categorization in the hierarchical categorization of the sound determines a first haptic event for a one or more feedback devices and a fine categorization in the hierarchy of the sound determines a second haptic event for the one or more haptic feedback devices.

18. The method of claim 17, wherein the sound is an onomatopoeic sound vocalized by a user.

19. The method of claim 17, further comprising, searching a database for the result of the categorization from the neural network.

20. The method of claim 17, wherein the one or more haptic feedback devices includes a first haptic feedback device and a second haptic feedback device, wherein the first haptic event is for the first haptic feedback device and wherein the second haptic event is for the second haptic feedback device.

* * * * *